US 6,742,831 B2

(12) United States Patent
Rees (10) Patent No.: US 6,742,831 B2
(45) Date of Patent: Jun. 1, 2004

(54) APPARATUS AND METHOD FOR INCREASING DOWNWARD FORCE EXERTED ON A SPINNING VEHICLE

(76) Inventor: Clayton B. Rees, 655 Smith Chapel Rd., Tullahoma, TN (US) 37388

( * ) Notice: Subject to any disclaimer, the term of this patent is extended or adjusted under 35 U.S.C. 154(b) by 0 days.

(21) Appl. No.: 10/651,065

(22) Filed: Aug. 28, 2003

(65) Prior Publication Data

US 2004/0036320 A1 Feb. 26, 2004

Related U.S. Application Data (63) Continuation-in-part of application No. 10/083,274, filed on Oct. 19, 2001, now Pat. No. 6,637,805.

(51) Int. Cl.[7] .................................................. B60J 1/18
(52) U.S. Cl. ..................................... 296/180.1; 180/903
(58) Field of Search ...................... 296/180.1; 188/270; 180/903

(56) References Cited

U.S. PATENT DOCUMENTS

| 3,721,466 A | 3/1973 | Abrams |
| 4,119,339 A | 10/1978 | Heimburger |
| 4,379,582 A | 4/1983 | Miwa |
| 4,653,795 A | 3/1987 | Soderberg |
| 4,946,218 A | 8/1990 | Jurik |
| 4,976,489 A | 12/1990 | Lovelace |
| 5,054,844 A | 10/1991 | Miwa |
| 5,184,832 A | 2/1993 | Miwa |
| 5,374,098 A | 12/1994 | Nelson |
| 5,454,619 A | 10/1995 | Haraway |
| 5,544,931 A | 8/1996 | Nelson |
| 5,908,217 A | 6/1999 | Englar |
| 6,033,010 A | 3/2000 | Preiss |
| 6,086,146 A | 7/2000 | Nabuurs |
| 6,196,620 B1 | 3/2001 | Haraway, Jr. |
| 6,685,256 B1 * | 2/2004 | Shermer ................... 296/180.4 |
| 2003/0075950 A1 | 4/2003 | Rees |
| 2003/0173798 A1 * | 9/2003 | Steinicke et al. ........ 296/180.1 |

FOREIGN PATENT DOCUMENTS

| DE | 3611750 A1 | 10/1987 |
| DE | 3630435 A1 | 3/1988 |
| DE | 3245410 A1 | 6/1998 |
| JP | 60088687 A | 5/1985 |
| JP | 02001-10543 A | 1/2001 |

* cited by examiner

Primary Examiner—D. Glenn Dayoan
Assistant Examiner—Paul Chenevert
(74) Attorney, Agent, or Firm—Summa & Allan, P.A.

(57) ABSTRACT

An apparatus for increasing the safety of automobiles traveling at high speeds capable of increasing the downward force on a yawed vehicle comprises in one embodiment an air inlet opening, an air exit opening, and an air path, wherein the air exit opening directs flowing exiting air in such a manner as to avoid interfering with the air spoiling operations of the surface of the vehicle. In an alternative embodiment, the invention comprises an air inlet opening, an air exit opening, an air path, and a platform fixed at one end to a rear underside portion of the vehicle that pivots open under the force of flowing air to disrupt air flowing under a yawed vehicle to thereby exert a downward force on the yawed vehicle. A method of directing air into a yawed vehicle traveling at high speed to exert a downward force on the yawed vehicle.

27 Claims, 6 Drawing Sheets

APPARATUS AND METHOD FOR INCREASING DOWNWARD FORCE EXERTED ON A SPINNING VEHICLE

CROSS-REFERENCE TO RELATED APPLICATION

This application is a continuation-in-part of copending U.S. application Ser. No. 10/083,274, for Apparatus and Method for Increasing Downward Force Exerted on a Spinning Vehicle, which was filed Oct. 19, 2001 granted U.S. Pat. No. 6,637,805 on Oct. 28, 2003, and which is herein incorporated by reference in its entirety.

FIELD OF THE INVENTION

The invention relates to a safety apparatus for vehicles traveling at his speed. In particular, the invention relates to an apparatus particularly suited for competitive racing vehicles that directs air into a vehicle that is yawed from a forward path of travel in such a manner to exert an increased downward force on the surfaces of the vehicle. The invention further relates to a method of directing air into a yawed vehicle traveling at high speed to exert a downward force on the vehicle.

BACKGROUND OF THE INVENTION

Automobile racing, and in particular racing sanctioned by the National Association for Stock Car Auto Racing (NASCAR), has become one of the most competitive sporting events in the United States. NASCAR is currently the fastest growing spectator sport in the U.S. whose average annual attendance grew by 65% within the period 1990–1997. Moreover, NASCAR is the only professional sport that enjoyed increased growth in its television audience during the 1990's. Revenues for NASCAR approached $2.2 billion in 1999, placing NASCAR third behind the National Football League (NFL) and Major League Baseball (MLB) in operating income and ahead of the National Basketball Association (NBA) and National Hockey League (NHL). In 2000, NASCAR signed a $2.4 billion, six-year television contract with NBC, FOX, and Turner Sports. The contract placed NASCAR ahead of Major League Baseball, National Basketball Association, and National Hockey League in terms of average annual television revenues. Moreover, NASCAR is second only to the NFL among televised sporting events in the U.S. In 1998, NASCAR generated more than $1.1 billion in sponsorship revenues, which is more than double the combined revenue of the NBA, NFL, NHL, and MLB.

The increased popularity in racing has led to an influx of economic sponsorship, and hence an increase in the amount of money invested in the research and development of racing vehicles. As a result of the technological improvements in the design of racing vehicles and engines, the speeds at which the vehicles race has increased dramatically over the years. During the 1980's and 1990's, Winston Cup cars achieved speeds of over 200 miles per hour (mph). Because of safety concerns, NASCAR sought a number of practices to reduce speed and increase safety.

One such practice was the incorporation of a restrictor plate (i.e., a thin aluminum plate that fits between the carburetor and the intake manifold of the engine) into the engines to reduce speeds and hence increase the likelihood of a driver surviving a major crash. Subsequently, NASCAR approved the use of aerodynamically responsive roof flaps that are affixed to the tops of vehicles. The roof flaps as described in U.S. Pat. Nos. 5,374,098 and 5,544,931 to Nelson actuate upwards when the vehicle becomes yawed from the forward path of travel (i.e., spins) to present a vertical surface to the flowing air, thereby increasing drag and reducing the speed of the spinning vehicle. As used herein, it will be understood that the term "forward path of travel" means the direction that a vehicle is moving when operated under normal conditions such that the longitudinal axis of the vehicle is parallel to the track and the front of the car is facing forward. Likewise, a direction yawed from a forward path of travel means the longitudinal axis of the vehicle is rotated about its vertical axis, as occurring during a spin.

Despite improved safety features, the likelihood of driver injury during a crash at speeds of over 180 mph remains high. Furthermore, the recent death of Dale Earnhardt, one of the most successful and most popular drivers, has elevated safety concerns to a top priority with NASCAR.

The underlying goal of racing, that is, faster speeds, frustrates ongoing safety efforts. It will be understood by those familiar with competitive racing that conventional racing vehicles are designed to achieve the fastest speeds within the regulatory regime of a sanctioning body, such as NASCAR. In other words, the body structure of the vehicle is designed to present the least amount of aerodynamic drag, while providing the greatest amount of downward force (or "down force") on the vehicle while the vehicle is traveling in a forward path of travel.

In addressing safety and performance considerations, designers must consider the four physical forces acting on a moving vehicle. In aerodynamic terms, these forces are expressed by lift (L) which acts perpendicular to the forward path of travel, drag (D) which acts parallel to the forward path of travel, weight (W) which acts vertically towards the center of the earth, and thrust (T) which acts parallel to the forward path of travel. Thrust, provided in this case by a vehicle engine, is counteracted by drag created by the flowing air traveling along the vehicle surfaces. Lift created by the air flowing under the vehicle and over contoured surfaces is counteracted by the weight of the vehicle, and any aerodynamic force created by the vehicle body and spoilers or air dams on the vehicle surface.

As air flows along the contoured surfaces of a vehicle, different velocities are produced. In turn, these varying velocities produce differential pressures that are distributed over the surface of the vehicle. More specifically, the aerodynamic pressures acting over a particular area produce an aerodynamic force. Aerodynamic force is a function of pressure acting over a surface area. In order to produce down force, it is desirable to produce higher pressure on the top side of the vehicle in order to produce lower pressure on the underside of the vehicle. Furthermore, aerodynamic pressure ideally acts over a substantially horizontal area to generate a down force or negative lift. For example, aerodynamic lift on a vehicle is primarily generated over horizontal areas such as the engine hood, roof, rear deck (or trunk lid), and the underside of the vehicle. Conversely, to create aerodynamic drag, aerodynamic pressure ideally acts over a substantially vertical area. For example, drag is influenced strongly by the pressures acting on the rear spoiler.

As described, aerodynamic down force is an important factor affecting the performance and safety of high-performance racing vehicles. In regards to performance and handling, an increase in down force acting on the vehicle also improves the handling of the vehicle at high speeds and especially in turns. For example, if the air flow is separated or "departs" from the rear deck of a vehicle during a turn, the down force decreases and the rear end tends to slide as the vehicle rotates about a vertical axis, thereby causing the vehicle to become yawed with respect to the forward path of travel. In order to produce down force, horizontal airflow resulting from a vehicle in motion must be redirected upwards. As applied to a Winston Cup car, the spoiler on the rear deck of the vehicle redirects the air upward and increases the down force on the rear end of the vehicle. In order to maximize rear end down force, analysis indicates that the aerodynamic down force acting on the vehicle should be as far to the rear as possible.

In regards to safety, it is desirable to create the maximum amount of down force on a vehicle during high-speed backward movement or a spin to prevent a vehicle from flipping or becoming airborne. Specifically, an increase of down force on a yawed vehicle can prevent the vehicle from flipping upon entering a high-speed spin. Most devices are designed to produce down force on a vehicle traveling in a forward path of travel. Thus, during a spin, these devices may actually produce lift, which tends to destabilize a spinning vehicle. Thus, it is necessary to provide a device that can increase down force on a yawed vehicle that does not negatively affect the aerodynamics of a vehicle traveling in a forward path of travel.

As noted, conventional racing vehicles include aerodynamically designed spoilers, air dams, and other air spoiling devices for increasing the amount of down force acting on a vehicle traveling in a forward path of travel. Heightened safety concerns during the 1990's led to the inclusion of roof flaps described above to increase the down force acting on a vehicle during a spin. The roof flap spoils the air traveling over the surface of the roof, thereby increasing the down force on the vehicle and slowing the vehicle down. Nevertheless, as witnessed during several races, the roof flaps have occasionally failed to prevent a vehicle from becoming airborne when spinning or traveling backwards at high speeds.

One option to counteract the likelihood of flipping during a high-speed spin is to increase the size of roof flaps and roof fences on the surfaces of racing vehicles. However, the addition of air spoiling devices on the surface of the vehicle may reduce performance, and therefore is a less desirable option. Moreover, the number of additional air spoiling devices is dictated by the amount of available free space on the surface of the racing vehicle.

Thus, a more attractive option is to increase the amount of down force acting on a spinning vehicle without increasing the total number of, for example, spoilers, roof flaps, or roof fences on the exterior surface of the vehicle. In this fashion, aerodynamic performance of the vehicle is not hindered when the vehicle is traveling in a forward path of travel.

Accordingly, there is a need for a safety apparatus that increases the down force acting on a yawed vehicle during a high-speed spin, and that avoids interfering with the air spoiling operation of other devices such as roof flaps and rear spoilers.

OBJECT AND SUMMARY OF THE INVENTION

It is therefore an object of the present invention to provide an apparatus capable of exerting a downward force on a yawed vehicle, without affecting the performance of the vehicle while traveling in a forward path of travel.

Another object of the invention is to provide a safety apparatus that can be readily incorporated into existing racing vehicles without the need for performing major structural modifications on existing racing vehicles.

Yet another object of the invention is the provision of a safety apparatus that can be incorporated into the internal structure of the racing vehicle.

A further object of the invention is to provide a method of directing air into a racing vehicle traveling at high speed in a direction yawed from the forward path of travel to exert a downward force on the vehicle.

Another object of the invention is to maximize the survivability rate of a driver involved in a high-speed spin.

The invention meets these objectives with an apparatus capable of exerting a downward force on a vehicle during a spin or high-speed backward movement. In particular, the invention is an apparatus comprised of an air inlet opening in the rear of a vehicle that admits a flow of air when the vehicle is yawed from the forward path of travel, an air exit opening in communication with the air inlet opening that directs flowing air to exert a down force on the vehicle, and an air path that directs flowing air from the air inlet opening to the air exit opening. The invention further meets these objectives with a method for directing flowing air into the vehicle to exert a downward force on a yawed vehicle traveling at high speed.

The foregoing and other objects and advantages of the invention and the manner in which the same are accomplished will become clearer based on the following detailed description taken in conjunction with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
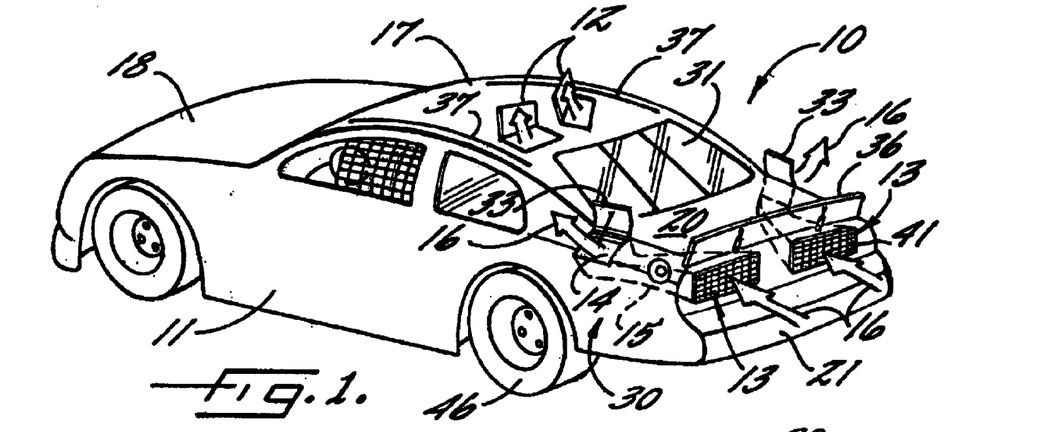
FIG. 1 is a perspective view of a preferred embodiment of the apparatus as incorporated into a stock car having roof flaps and spoilers that depicts flowing air entering air inlet openings positioned at the rear of the vehicle, traveling along the air paths, and exiting at the air exit openings positioned at the rear quarter panel regions of the vehicle.

An overall view of an apparatus 10 as incorporated into a racing vehicle 11 having roof flaps 13 and which depicts features of the present invention is set forth in FIG. 1. It will be understood by those skilled in the art that the term automobile will mean a self-propelled vehicle; hence, the term automobile, vehicle, and car may be used interchangeably herein. It will be further appreciated by those skilled in the art that the present invention may be incorporated into a variety of racing vehicles to include opened wheel bodies (e.g., Formula 1 bodies) and closed wheel bodies (e.g., stock car bodies). As depicted in figures of the preferred embodiment, the present invention is preferably incorporated into stock cars or closed wheel bodies.

Figure 2:
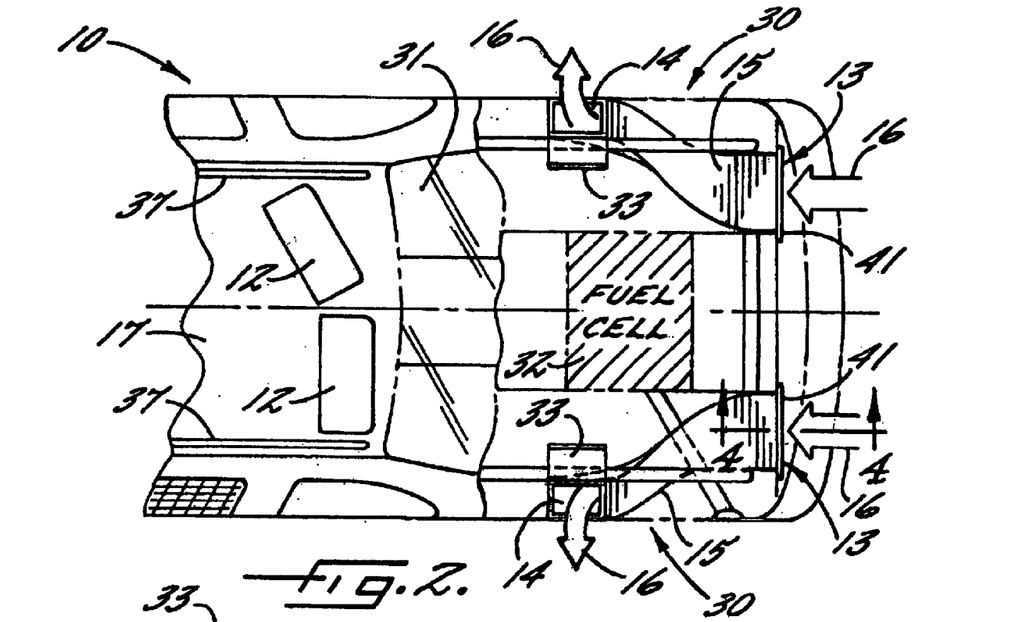
FIG. 2 is a top sectional view of the preferred embodiment of the invention and its positional relationship to a fuel cell that depicts flowing air entering the air inlet openings, traveling along the air paths positioned adjacent the fuel cell, and exiting at the air exit openings.
Figure 3:
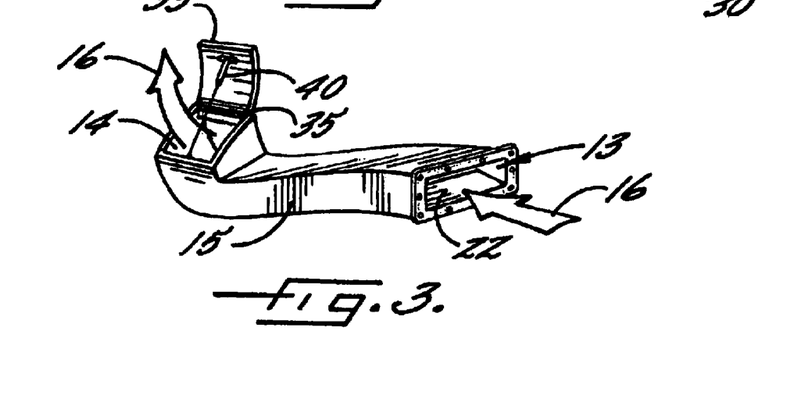
FIG. 3 is a perspective view of the preferred embodiment of the invention depicting the air inlet opening, the air path, and the air exit opening.

As depicted in FIGS. 2 and 3, the apparatus 10 includes an air inlet opening 13, an air exit opening 14, and an air path 15. The air inlet opening 13 is positioned in the rear of the vehicle 11 and is capable of admitting a flow of air 16 into the rear of the vehicle when the vehicle is traveling in a direction yawed from a forward path of travel. In other words, the air inlet opening 13 is configured to admit flowing air 16 into a vehicle during a spin or high-speed backward movement. In a preferred embodiment, the air inlet opening 13 is positioned in the rear surface of the vehicle 11 between the rear deck 20 and the rear bumper 21. As illustrated in FIGS. 1 and 3, the air inlet opening 13 is rectangular, but may be any number of shapes to include, but not limited to, square, circular, or triangular. Specifically, the air inlet opening 13 is oriented in a plane that is substantially perpendicular to the path of flowing air 16 distributed against the rear end of a yawed vehicle. Stated differently, the air inlet opening 13 is oriented in a plane that is substantially parallel to the surface of the vehicle 11 (i.e., flush with the rear face of the vehicle). As depicted in FIGS. 1 and 2, the preferred embodiment of the invention includes a pair of air inlet openings 13, a pair of air exit openings 14, and a pair of air paths 15 that are positioned equidistant from the longitudinal centerline or axis of the vehicle 11.

As configured, the air inlet opening 13 admits more flowing air 16 as the degree of yaw of the vehicle 11 increases during a spin with respect to the forward path of travel. The increased amount of air flowing into the air inlet opening 13 consequently distributes air pressure differentials acting on the surface of the vehicle 11 in such a manner as to increase the amount of down force acting on the vehicle. Further, the air inlet opening 13 admits the maximum amount of flowing air 16, and thus provides the greatest amount of down force, when the vehicle 11 is yawed 180 degrees (°) from the forward path of travel, that is, when the vehicle is traveling backwards.

Figure 4:
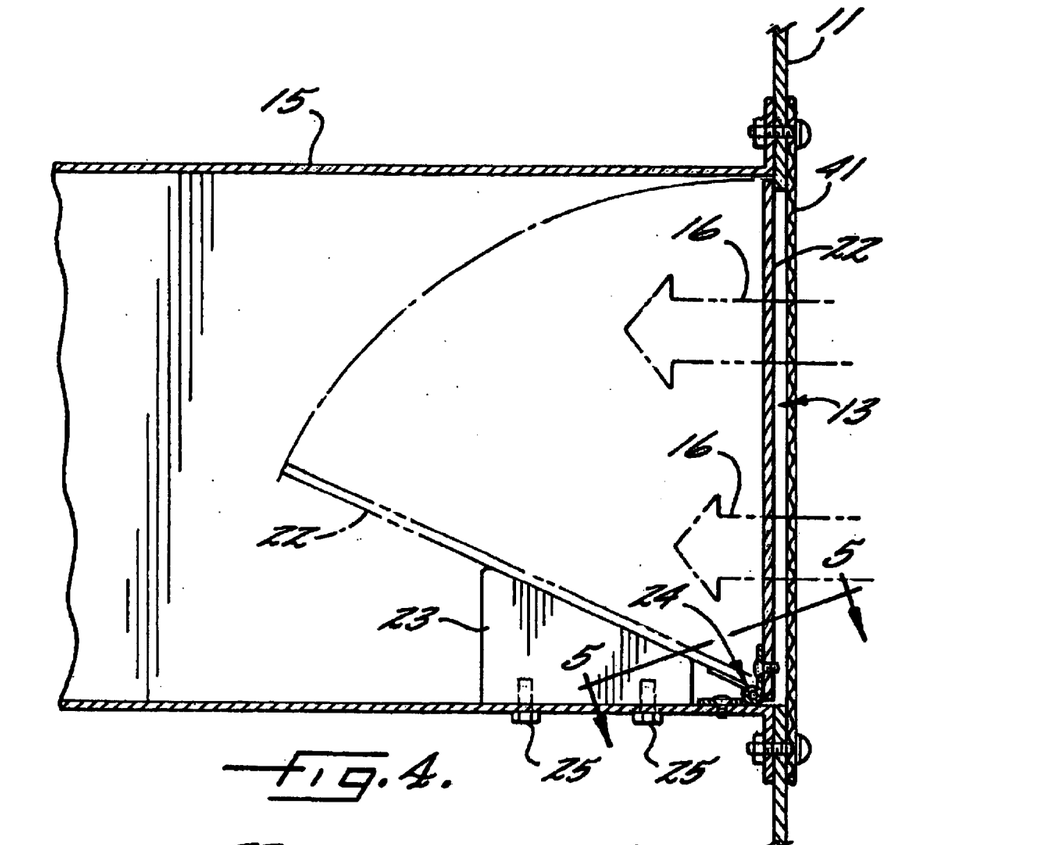
FIG. 4 is a partial side sectional view of the preferred embodiment taken along lines 4—4 of FIG. 2 illustrating the air inlet opening comprised of a pivoting gate, a stop for restricting the movement of the gate, and webbing for preventing debris from entering the air inlet opening when the vehicle is yawed.
Figure 4A:
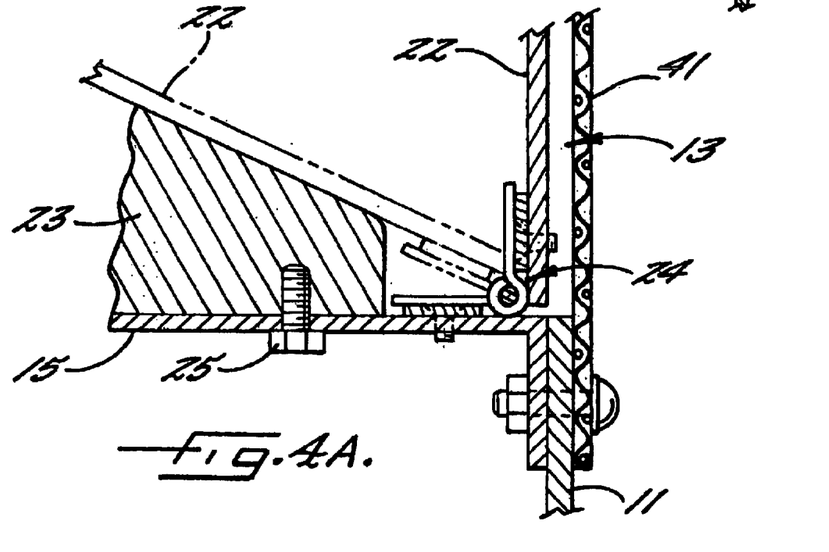
FIG. 4A is an enlarged partial side sectional view of the preferred embodiment of air inlet opening depicting a spring-biased gate and its interaction with the stop.

With reference to FIGS. 4 and 4A, the air inlet opening 13 includes a gate 22 for controlling the flow of air 16 into the air path 15 and a stop 23 for restricting the movement of the gate in an open position. The air inlet gate 22 may include any number of devices for controlling the passage or flow of air. In a preferred embodiment, the air inlet gate 22 is a substantially rectangular planar flap that pivots about an axis that is substantially coplanar to the air inlet opening 13. Nevertheless, it will be understood that the flap may be any number of shapes to include, but not limited to, a square, circle, or triangle. Furthermore, the flap is not necessarily planar and can be concave or convex in shape. It will be understood that the air inlet gate 22 may be pivotably secured to a top, bottom, or side portion of the air inlet opening 13. In an alternative embodiment, the air inlet gate 22 may include a plurality of vanes or louvers that pivot about axes that are substantially coplanar to the air inlet opening 13.

Figure 5:
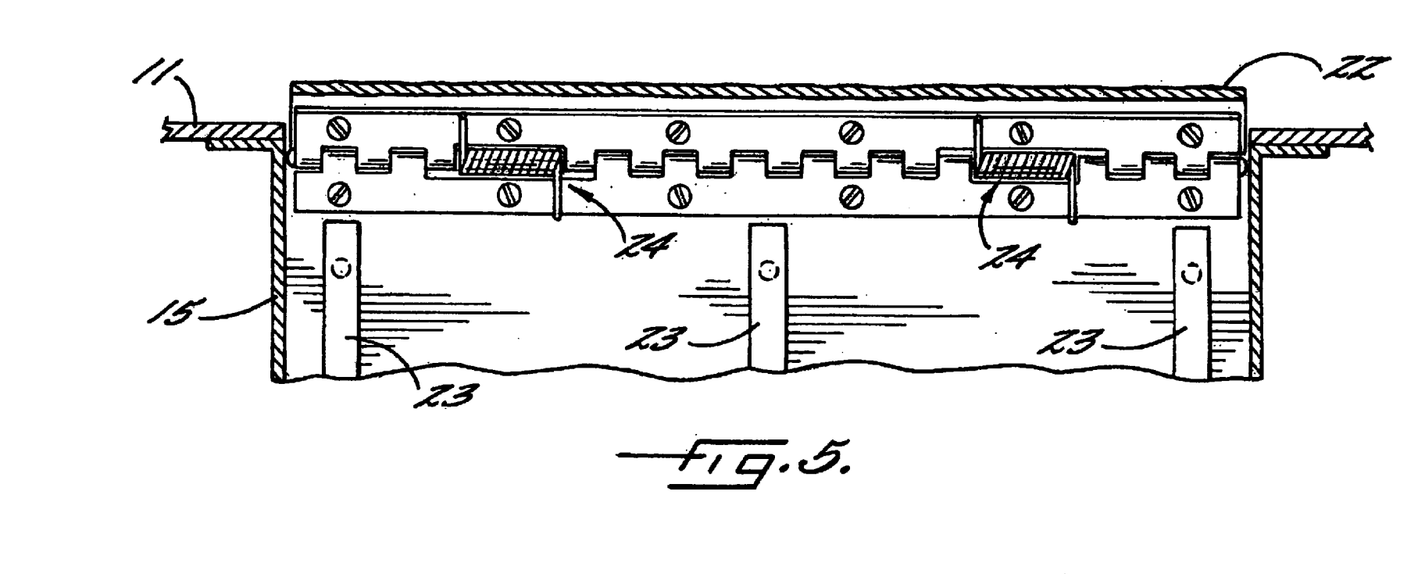
FIG. 5 is an enlarged partial front view of the preferred embodiment of the gate taken along lines 5—5 of FIG. 4 illustrating the spring-biased hinge connection between the air inlet opening and the gate.
Figure 6:
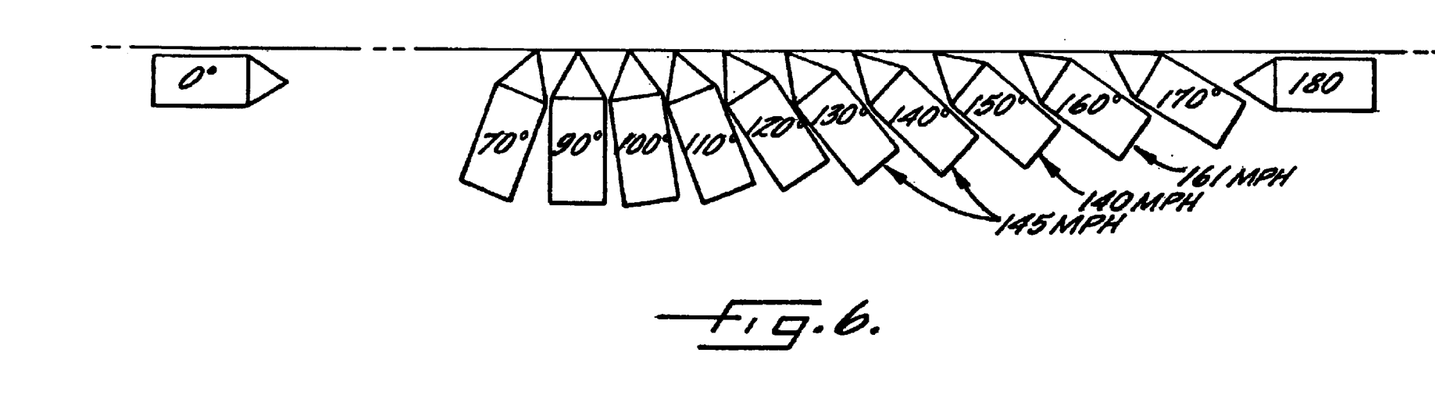
FIG. 6 is a diagram indicating the yaw angle of the moving vehicle traveling in the forward path of travel (i.e., 0°), and traveling backward (i.e., 180°), as well as exemplary speeds at which the moving vehicle lifts off of the track.

The air inlet gate 22 is closed when the vehicle 11 is traveling in a forward path of travel and pivots open under the force of flowing air 16 when the vehicle is yawed during a spin. See FIG. 4. In a preferred embodiment shown in FIG. 5, the air inlet gate 22 is spring-biased by a hinge connection 24 in a closed position and is aerodynamically actuated by the flowing air 16 to open inward toward the air path 15. Preferably, the air inlet gate 22 is actuated when the spinning vehicle 11 is traveling backwards in excess of 50 mph. See FIG. 6.

As illustrated in FIGS. 4 and 4A, the stop 23 restricts the movement of the air inlet gate 22 in the open position. It will be understood that the stop 23 may be formed from any number of hard or resilient materials (e.g., metal or plastic). It will be further understood that the stop 23 may be any number of shapes to include, but not limited, to a square, rectangle, or triangle. As illustrated in FIGS. 4 and 4A, the stop 23 is preferably formed of metal and triangular in shape. Advantageously, the stop 23 permits an operator to regulate the amount of air flowing into the rear of the yawed vehicle 11, depending upon the expected speeds at a particular track and the amount of down force required to prevent the vehicle from becoming airborne during a high-speed spin. Stated differently, a stop having a greater angle of incline relative to the horizontal plane of the air path 15 produces less down force. Preferably, stops having a 15° incline are suitable for tracks supporting high speeds (e.g., 180 plus mph at Daytona, Fla.) and stops having a 30° incline are suitable for tracks supporting slower speeds (e.g., 140 plus mph at Bristol, Tenn.).

Referring to FIGS. 4 and 4A, the stop 23 is preferably affixed to an internal lower surface of the air path 15 with screws 25, but may be secured to an internal upper or side surface of the air path 15. The stop 23 may also be adhered to the internal upper, lower, or side surfaces of the air path 15 with an industrial strength adhesive. Accordingly, the stop 23 could also include a bracket affixed to the internal upper, lower, or side surface of the air path 15 to restrict the movement of the air inlet gate 22 in the open position.

As depicted in FIGS. 2 and 3, the air path 15 is positioned between the air inlet opening 13 and the air exit opening 14 and directs air flowing from the air inlet opening to the air exit opening. Stated differently, the air path 15 provides communication between the air inlet opening 13 and the air exit opening 14. It will be understood that the air path 15 may be formed from any number of materials to include plastic or metal (e.g., aluminum or sheet metal ductwork). Those skilled in the art will appreciate that the shape and dimensions of the air path 15 are not limited to those depicted in the drawings. For example, the cross-section of the air path 15 may vary depending upon the desired amount of down force.

The air exit opening 14 is positioned forward of the air inlet opening 13 and directs flowing air 16 entering the air inlet opening and distributes resulting pressure differentials in such a manner to exert a downward force on the yawed vehicle 11 as the flowing air exits the air exit opening.

In a preferred embodiment of the present invention illustrated in FIGS. 1 and 2, the air exit opening 14 is positioned in at least one side surface of the vehicle 11. Specifically, the air exit opening 14 is positioned in a rear quarter panel region 30 of the vehicle 11. Further, the air exit opening 14 is oriented in a plane that is substantially perpendicular to the path of flowing air 16 from the air inlet opening 13. In other words, the air exit opening 14 is oriented in a plane that is substantially parallel to the rear quarter panel surface 30 of the vehicle 11. In this preferred configuration, air exit opening 14 directs the flowing exiting air 16 in a substantially lateral and upward direction with respect to the sides of the vehicle in such a manner to exert a downward force on the vehicle 11. As noted above, the venting of the flowing exiting air 16 distributes aerodynamic pressures generated across the surface of the vehicle 11 to exert a downward force acting on the vehicle. Advantageously, the air exit opening 14 directs the flowing exiting air 16 in such a manner that avoids interfering with the air spoiling operations of the roof flaps 12. In aerodynamic terms, the streamline of flowing air 16 exiting the air exit opening 14 is directed to areas adjacent the sides of the vehicle 11, and not in the direct path of the streamline of air that flows over the centerline of the vehicle (i.e., roof) and actuates the roof flaps 12 of the vehicle 11.

Figure 7:
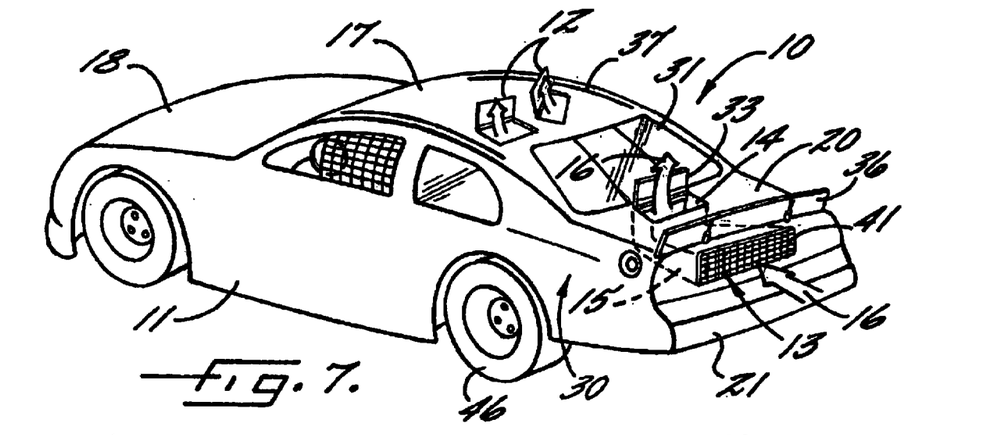
FIG. 7 is a perspective view of an alternative embodiment of the apparatus as incorporated into a stock car having roof flaps and spoilers that depicts flowing air entering an air inlet opening positioned at the rear of the vehicle, traveling along the air path, and exiting at an air exit opening positioned in the rear deck adjacent the rear window of the vehicle.
Figure 8:
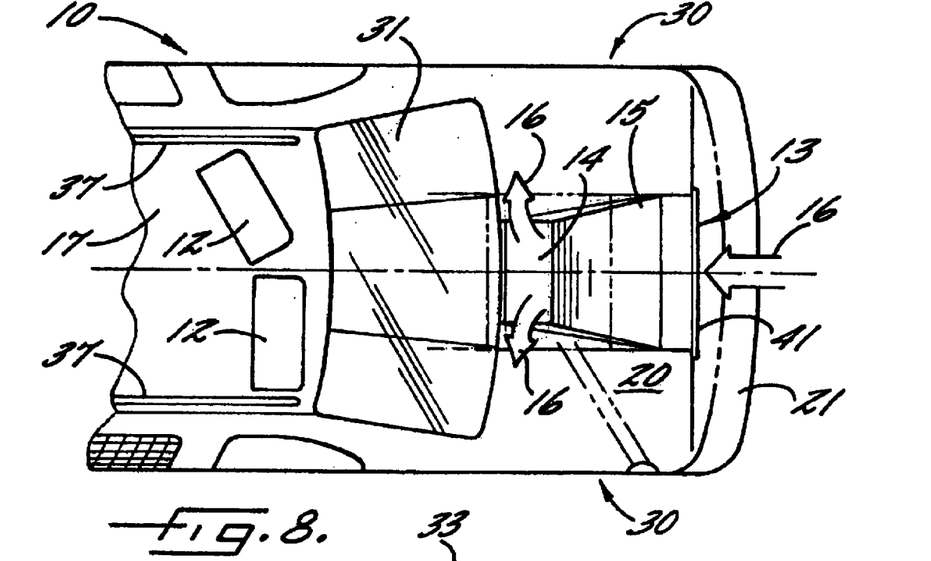
FIG. 8 is a top sectional view of the alternative embodiment of the invention and its positional relationship to the fuel cell that depicts flowing air entering the air inlet opening, traveling along the air path positioned adjacent the fuel cell, and exiting at the air exit opening.
Figure 9:
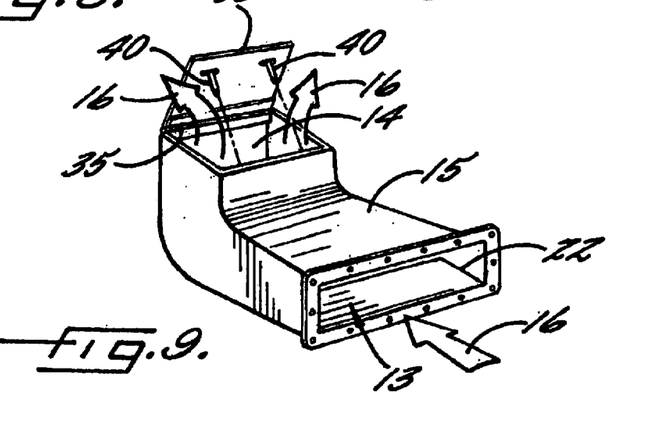
FIG. 9 is a perspective view of the alternative embodiment of the invention depicting the air inlet opening, the air path, and the air exit opening.

As depicted in FIGS. 7, 8, and 9, the alternative embodiment of the invention includes one air inlet opening 13, one air exit opening 14, and one air path 15. Specifically, the single air inlet opening 13 is positioned in the center of the rear end of the vehicle 11. The single air exit opening 14 of the alternative embodiment is positioned in a top surface of the vehicle 11, as opposed to the rear quarter panel region 30 of the vehicle in the preferred embodiment. In particular, the air exit opening 14 is positioned in the surface of the rear deck 20 adjacent the rear window 31 of the vehicle 11. In the alternative embodiment, the air exit opening 14 directs the flowing exiting air 16 upwards to create a down force on the vehicle 11. The single air path 15 of the alternative embodiment extends forward from the air inlet opening 13, over the fuel cell 32, and then upwards to the air exit opening 14.

The air exit opening 14 includes a gate 33 for venting the flow of air from the air inlet opening 13 and a stop 34 for restricting the movement of the gate in an open position. The air exit gate 33 may include any number of devices for controlling the passage or flow of air. In a preferred embodiment, the air exit gate 33 is a substantially rectangular planar flap that pivots about an axis that is substantially coplanar to the air exit opening. Nevertheless, it will be understood that the flap may be any number of shapes to include square, circular, or triangular. Furthermore, the flap is not necessarily planar and can be concave or convex in shape. It will be understood that the air exit gate 33 may be pivotably secured to a top, bottom, or side portion of the air exit opening. In an alternative embodiment, the air exit gate 33 may include a plurality of vanes or louvers that pivot about axes that are substantially coplanar to said air inlet opening.

The air exit gate 33 is closed when the vehicle is traveling in a forward path of travel and pivots open under the force of flowing air 16 from the air inlet opening 13 when the vehicle is yawed during a spin. In a preferred embodiment, the air exit gate 33 is spring-biased by a hinge connection 35 in a closed position and is aerodynamically actuated by the air flowing from the air inlet opening 13 to open outward as illustrated in FIGS. 3 and 9.

The preferred and alternative embodiments may further provide a means for restricting the movement of the air exit gate 33. As illustrated in FIGS. 3 and 9, the restricting means may include a cable 40 preferably of wire or elastic material that secures a free end of the air exit gate 33 to a portion of the air path 15.

The air inlet opening 13 further includes webbing 41 that prevents the admission of debris into the air inlet opening when the vehicle 11 is yawed from the forward path of travel and the air inlet gate 22 is open. The webbing 41 is preferably formed of molded aromatic polyamide fiber such as the product sold under the trademark Kevlar® commercially provided by E. I. du Pont de Nemours and Company. It will be appreciated that the webbing 41 may also be formed of plastic, textile, or steel mesh materials.

Referring to FIGS. 10, 11, 12, and 13, an alternative embodiment of the invention provides a pivoting platform 42 that is fixed at one end 50 to a rear underside portion of the vehicle 11. Specifically, the platform 42 is positioned at an angle adjacent a rear surface of the fuel cell 32. The platform 42 includes a free end 51 that is adjacent the rear end of the vehicle 11 and opposing sides or edges 52 that are spaced apart from the rear underside portion of the vehicle. The platform 42 is configured to close to a position substantially flush with the underside of the vehicle 11 when the vehicle is traveling forward and to pivot open under the force of flowing air 16 when the vehicle is yawed.

In the open position, the platform 42 distributes flowing air 16 traveling under the yawed vehicle 11 in a manner that increases the downward force on the yawed vehicle. In the closed position, the platform 42 does not adversely affect the aerodynamic stability of the vehicle when traveling forward. In other words, the platform 42 does not reduce the downward force on the vehicle 11 as it travels forward.

The platform 42 further includes a means for restricting the range of movement of the platform. The restricting means may include, but is not limited to, at least one cable 43 securing a portion of the platform 42 to the rear frame 48 of the vehicle 11. The platform 42 is preferably connected to the frame 48 with eyelet screws 49 to thereby limit the movement of the platform in the open position. In the preferred embodiment depicted in FIG. 12, the restricting means is a cable and spring mechanism 44 that provides biasing of the platform 42 between the open and closed position. It will be understood that the cables may be formed of steel or elastic material.

Figures 10, 11, 12, 13:
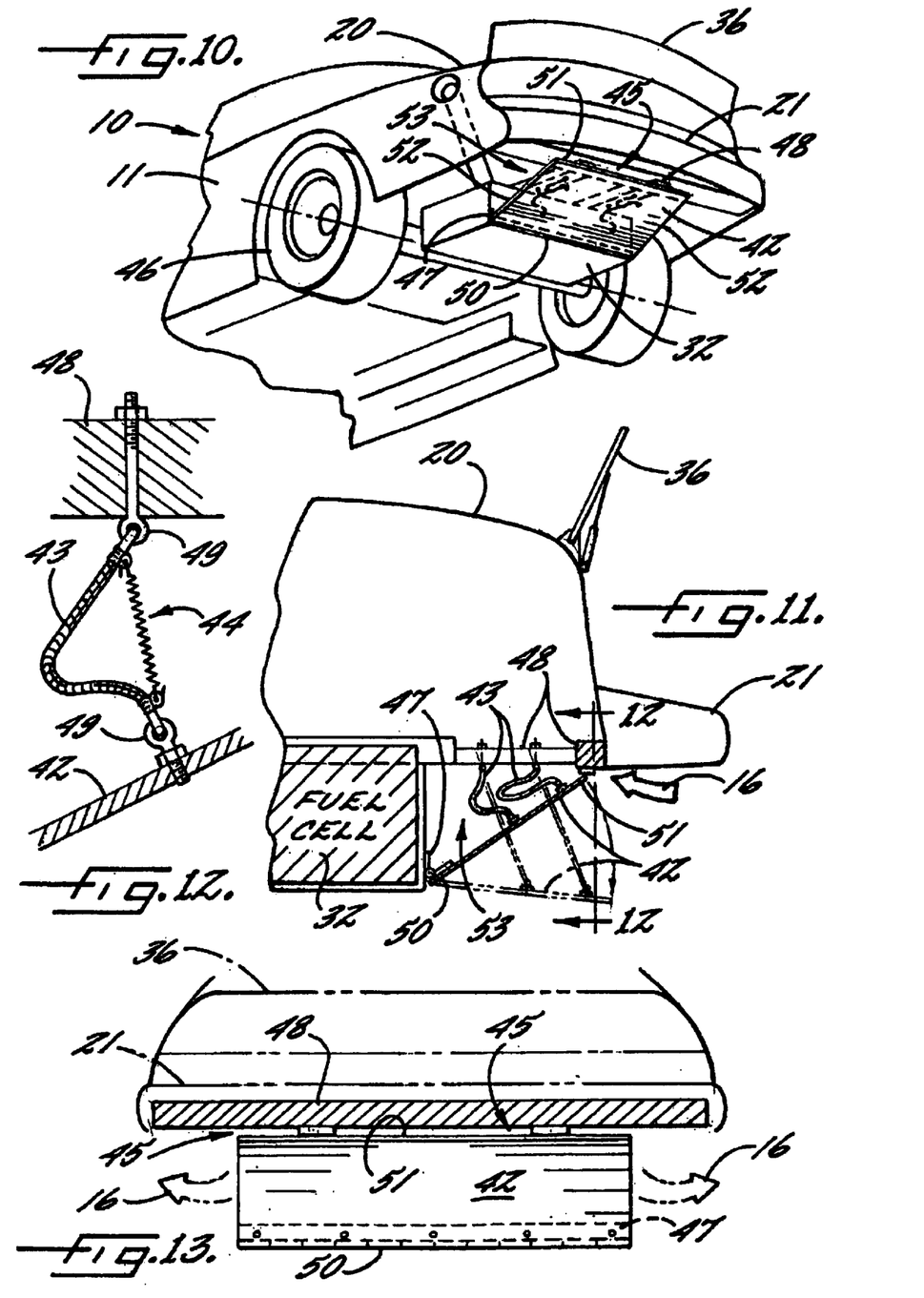
FIG. 10 is a partial perspective underside view of an alternative embodiment illustrating a platform secured at one end to the vehicle and positioned adjacent the fuel cell, an air inlet opening, and an air exit opening.
FIG. 11 is a partial side sectional view of the rear of the vehicle depicting the platform, a rear deck, a rear deck spoiler, a bumper, a fuel cell, and restraining cables.
FIG. 12 is an enlarged partial side sectional view taken along lines 12—12 of FIG. 11 showing the platform in the open and closed position and further showing a free end and a fixed end of the platform, wherein the fixed end is secured to the underside of the vehicle by a spring-biased cable mechanism that is secured at both ends by eyelet screws.
FIG. 13 is a partial front view of the rear end of the vehicle depicting the platform in a closed position.

The platform 42 further includes an air inlet opening or gap 45 defined by the free end 51 of the platform and the rear underside of the vehicle 11. The air inlet opening 45 directs flowing air 16 between the platform 42 and the rear underside of the yawed vehicle 11 to pivot the platform downward and into the open position. Air exit openings 53 defined by the opposing sides 52 of the platform 42 and the rear underside of the vehicle 11 are also provided. The air exit openings 53 provide an exhaust for the air flowing from the air inlet opening 45 and between the platform 42 and the rear underside of the vehicle 11.

As the vehicle 11 begins to yaw during a spin, pressure caused by air flowing against the rear of the vehicle increases. This increased pressure results in increased lift acting upwards against the rear of the vehicle 11. In operation, the increased pressure forces air into the air inlet opening 45 and the platform 42 pivots downward into the open position. In the open position, the platform 42 temporarily traps and then distributes the flowing air 16 laterally through the air exit openings 53 to thereby reduce pressure, decrease lift, and increase the downward force on the yawed vehicle 11. The speed at which the platform 42 pivots is determined by the amount of tension supported by the restricting means (e.g., cable and spring mechanism). Predictions indicate that a cable and spring mechanism 44 supporting 30 pounds of tension will cause the platform 42 to pivot when the spinning vehicle 11 is traveling backwards at 50 to 55 mph.

As configured, the air inlet opening 45 admits more flowing air 16 between the rear underside of the vehicle 11 and the platform 42 as the degree of yaw of the vehicle increases with respect to the forward path of travel. Furthermore, the air inlet opening 45 admits the maximum amount of flowing air 16 when the vehicle 11 is yawed 180° from the forward path of travel.

Figures 14A, 14B, 15:
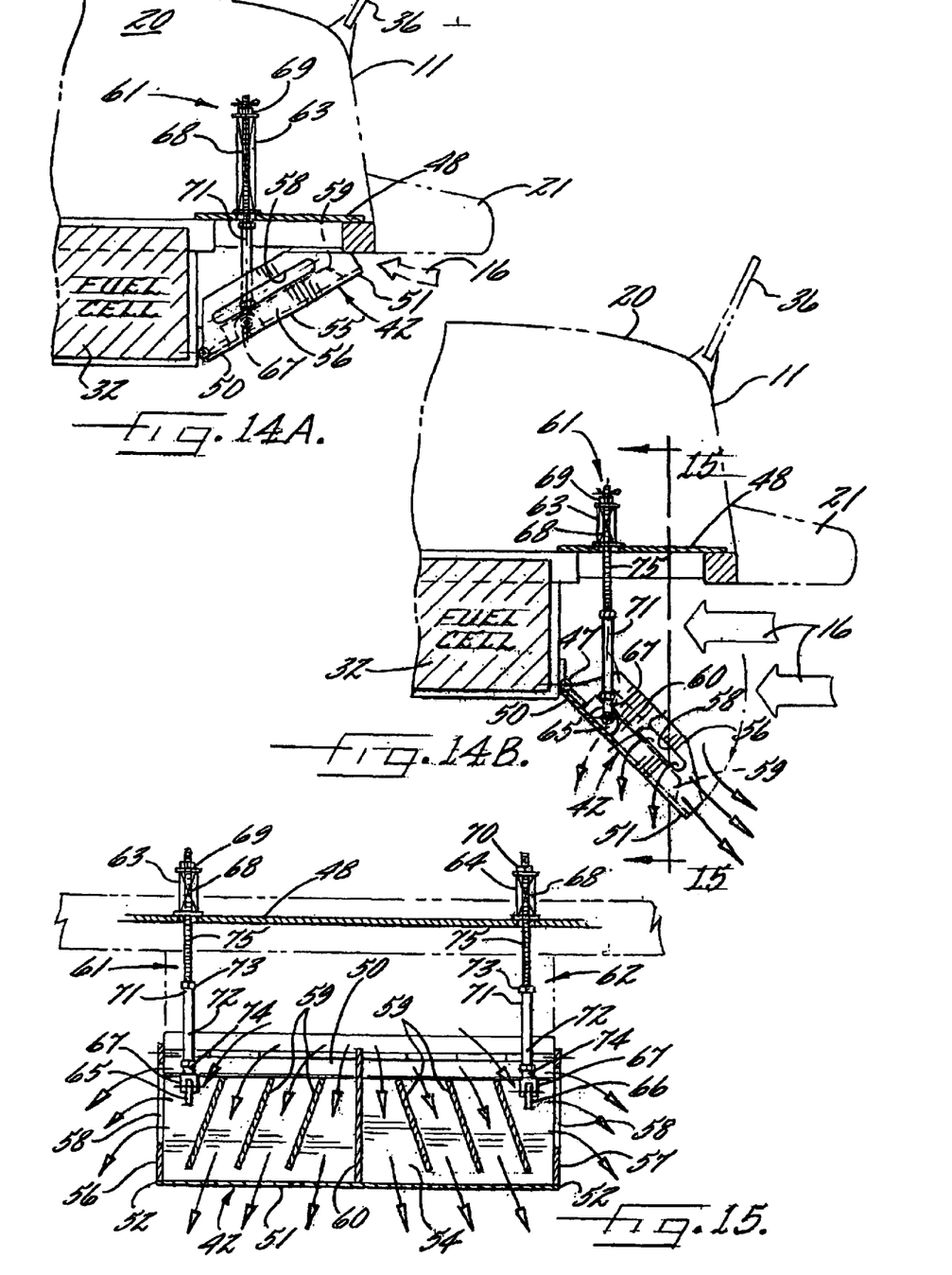
FIG. 14A is a partial side sectional view of the rear of the vehicle depicting an alternative embodiment of the platform, and illustrating the platform in the closed position, and further depicting a connector, and first and second side panels secured to opposing edges of the platform.
FIG. 14B is a partial side sectional view of the rear of the vehicle depicting the alternative embodiment of the platform, and illustrating the platform in the open position.
FIG. 15 is a partial front view of the rear end of the vehicle taken along lines 15—15 of FIG. 14B depicting the alternative embodiment of the platform in the open position, and illustrating a plurality of vanes and a rib positioned on an internal planar side of the platform.

Yet a more preferred of the invention as depicted in FIGS. 14A, 14B, and 15 provides a substantially rectangular pivoting platform 42 that is pivotally secured to a rear underside portion of the vehicle 11 by a hinge 47. In a more preferred embodiment, the platform 42 is pivotally secured to a lower edge of the fuel cell 32. Advantageously, placement of the platform 42 at the lowest aft area of the vehicle 11 counters the lift forces caused by the external surfaces of the vehicle during a spin (e.g., the spoiler 36 attached to the rear deck 20 of the vehicle). For example, the spoiler 36 on a vehicle 11 that is yawed 180° from the forward path of travel during a spin acts as a lifting body or wing. The present platform 42 deploys during such a spin and counters the lifting effect created by the spoiler 36. Furthermore, the fuel cell 32 offers a more rigid point of attachment for the platform 42 as compared to, for example, the bumper of the vehicle 11. Still further, placement of the platform 42 on the fuel cell 32 provides more protection as compared to known devices. For example, any spoiler secured to the bumper is more prone to damage during a spin caused by a rear end collision or a "bump and run" tactic often used by drivers as opposed to a device that is positioned inwardly of and spaced apart from the rear bumper 21.

The platform 42 also includes a fixed end 50, a free end 51, opposing edges 52, an internal planar side 54, and an external planar side 55. The free end 51 of the platform 42 is spaced inwardly and apart from the rear bumper 21 of the vehicle 11. As discussed above, the platform 42 is moveable between a closed position and an open position.

The platform 42 further provides first and second side panels 56, 57 that are connected to the opposing edges 52 of the platform and that form substantially parallel planes. The side panels 56, 57 extend upwardly from the platform 42 toward the underside of said vehicle 11. Accordingly, the side panels 56, 57 temporarily prevent flowing air 16 from immediately departing the edges 52 of the platform 42 and thereby facilitate the buildup of air pressure acting on the platform. This increased air pressure acting on the platform 42 increases down force acting on the rear of the vehicle 11. In this alternative embodiment, the first and second side panels 56, 57 each define at least one opening 58 for diverting flowing air 16. The openings 58 further assist in venting the flowing air 16 to the sides of the vehicle 11 (i.e., away from the underside of the vehicle) and assist in minimizing the build up of air pressure underneath the vehicle. As depicted in FIG. 14B, the first and second side panels 56, 57 are substantially trapezoidal in shape. Nevertheless, it will be understood by those skilled in the art that the side panels 56, 57 may be rectangular, triangular, or elliptical in shape.

The embodiment illustrated in FIGS. 14A, 14B, and 15 further provides a plurality of vanes 59 secured to the internal planar side 54 of the platform 42 for diverting flowing air 16 and increasing the downward force acting on the yawed vehicle 11. Advantageously, the vanes 59 act in conjunction with the openings 58 in the side panels 56, 57 to vent flowing air 16 to the sides of the vehicle 11, thereby decreasing the build up of air pressure underneath the vehicle 11. Further, the vanes 59 assist in deployment of the platform 42 when the vehicle 11 begins to yaw during a spin. The vanes 59 are preferably oriented on the internal planar side 54 of the platform 42 at approximately 15° measured from the centerline of platform. As used herein, it will be understood that the centerline of the platform 42 is measured from the fixed end 50 to the free end 51 of the platform and extends the width of the platform. As configured, the vanes 59 are oriented on the platform 42 to divert flowing air 16 substantially downward and towards the opposing edges 52 of the platform as depicted in FIG. 15.

At least one rib 60 is provided on the internal planar side 54 of the platform 42 for further diverting the flowing air 16 acting on the yawed vehicle 11 as illustrated in FIG. 15. The rib 60 and first and second side panels 56, 57 form substantially parallel planes. Specifically, the rib 60 is positioned to enhance the build up of pressure created by the flowing air 16 acting on the yawed vehicle 11. For example, during a spin with the platform 42 in the open position, the rib 60 will be oriented substantially perpendicular to the flowing air 16, thereby retarding the flowing air and increasing the down force acting on the vehicle 11.

Referring to FIGS. 14A and 14B, the more preferred embodiment further provides at least one variable length connector 61 for restricting the range of movement of the platform 42 as it moves between the closed and open position, at least one resilient member 63 mounted on one end of the connector, and at least one pivot hinge 65 that secures another end of the connector to the internal planar side 54 of the platform.

In a preferred embodiment, the platform 42 includes a first connector 61 and a second connector 62 that are spaced apart from one another. See FIG. 15. The connectors 61, 62 include a first end 67 that is pivotally secured to the internal planar side 54 of the platform 42, and a second end 68 that is adjustably secured to the rear frame 48 of the vehicle 11.

The preferred embodiment of the present invention includes a first and a second resilient member 63, 64. The resilient members 63, 64 are preferably springs that are mounted on the second ends 68 of the connectors 61, 62 and positioned adjacent to the rear frame 48. Nevertheless, those skilled in the art will understand that the resilient members 63, 64 may include any number of devices having resilient characteristics such as an elastic coil, a resilient tube, or the like. The resilient members 63, 64 facilitate movement of the connectors 61, 62 when the pivoting platform 42 moves between the closed position and the open position A first and second pivot hinge 65, 66 is provided in the preferred embodiment that connects the first ends 67 of the connectors 61, 62 to the internal planar side 54 of the platform 42. As shown in FIG. 15, the pivot hinges 65, 66 include a clevis secured to the platform 42 that receives a pin connected to the first end 67 of the connector 61 to thereby pivotally link the connector to the platform.

With reference to FIG. 14A, the more preferred embodiment includes a first and second adjustable stop 69, 70 secured to the second ends 68 of the connectors 61, 62. The stops 69, 70 are positioned adjacent to the resilient members 63, 64 and secure the resilient members between the second ends 68 of the connectors 61, 62 and the rear frame 48. Advantageously, a user is able to manually adjust the amount of tension exerted on the resilient members 63, 64 to thereby restrict or promote movement of the platform 42 between the closed position and the open position. Stated differently, movement of the stops 69, 70 along the second ends 68 of the connectors 61, 62 adjusts the amount of tension exerted on the resilient members 63, 64.

As described in more detail, the first and second connectors 61, 62 each include a hollow shaft 71 having a first end 72, a second end 73, a first rod 74, and a second rod 75. The shaft 71 defines a longitudinal axis and includes threaded internal surfaces at the first end 72 and the second end 73. The first rod 74 includes a threaded surface that correspondingly engages the first end 72 of the shaft 71. The second rod 75 likewise includes a threaded surface that correspondingly engages the second end 73 of the shaft 71. Accordingly, the first and second rods 74, 75 define the first and second ends 67, 68 of the connectors 61, 62, respectively.

The threaded surfaces on the shaft 71, the first rod 74, and the second rod 75 are oriented such that the length of the connectors 61, 62 is varied by rotating the hollow shaft 71 about its longitudinal axis to thereby move the first and second rods 74, 75 into and out of the ends 72, 73 of the hollow shaft. In other words, rotation of the shaft 71 in one direction will cause the rods 74, 75 to extend outwardly from the ends of the shaft, thus increasing the length of the connector 61.

The second rod 75 supports the stop 69 or, preferably a threaded nut, that secures the spring 63 between the second end 68 of the connector 61 and the rear frame 48. As referenced above, movement of the threaded nut 69 (i.e., stop) along the second rod 75 adjusts the amount of tension exerted on the spring 63 (i.e., resilient member) to thereby restrict or promote movement of the platform 42 between the closed position and the open position.

Another aspect of the invention includes a method of directing air into an automobile traveling at high speed to exert a downward force on the vehicle 11. It will be understood that the present method can be accomplished in conjunction with a variety of vehicles to include commercial and racing vehicles. The racing vehicles may include opened wheel and closed wheel body racing cars. This method is preferably accomplished on a closed wheel stock car as illustrated in FIG. 1. The present method provides for the admitting of a flow of air 16 into the rear of a yawed vehicle 11 and then directing the flowing air to distribute aerodynamic pressures on the surface of the vehicle to thereby exert a downward force on the yawed vehicle.

In a preferred method, a flow of air 16 is admitted into the rear of the vehicle 11 at the air inlet opening 13 when the vehicle is traveling in a direction yawed from the forward path of travel. Thereafter, the flowing air 16 entering the rear of the vehicle 11 is directed along the air path 15 to the air exit opening 14 positioned forward of and in communication with the air inlet opening 13. Consequently, a downward force is exerted on the yawed vehicle 11 as the flowing air 16 exits the air exit opening 13. As known to those skilled in the art, the downward force results from the distribution of variant air pressures affecting the surface of the vehicle 11.

In a preferred method, the flowing exiting air 16 is directed out of the air exit opening 14 in a substantially lateral and upward direction relative to the rear quarter panel regions 30 of the vehicle 11. In an alternative method, the flowing air 16 is directed out of the air exit opening 14 upward in a vertical direction relative to the rear deck 20 of the vehicle 11. As known to those skilled in the art, the substantially upward flow of exiting air will likewise distribute air pressures acting on the vehicle 11 to create a downward force against the surface of the vehicle adjacent the air exit opening 14.

Advantageously, the preferred method directs the air in such a manner that avoids interfering with the air spoiling operations of the yawed vehicle 11. Specifically, the air flow 16 is directed out of the air exit opening 14 so as not to interfere with any roof flaps 12, rear spoilers 36, roof fences 37, or any other air spoiling features inherent to the surface of the vehicle 11 that are designed to increase drag and down force on a yawed vehicle.

As accomplished in the preferred embodiment incorporating a stock car, the present method directs the flowing air 16 from the air inlet opening 13 along the air path 15 to the air exit opening 14 such that the flowing air exits the vehicle 11 at a point that is spaced apart from and outboard of a wheel 46 or axle. Stated differently, the preferred method vents the exiting air away from the surface of a closed wheel body (e.g., stock car).

In an alternative method, a flow of air 16 is also admitted between the rear-mounted pivotable platform 42 and the underside of the vehicle 11 when the vehicle is yawed.

Specifically, the flowing air 16 is admitted into the air inlet opening or gap 45 formed by the free end 51 of the platform 42 and the underside of the vehicle 11. Consequently, if the yawed vehicle 11 attains a predetermined speed during backward movement, the flowing air 16 is directed through the air inlet opening 45 and between the platform 42 and the rear underside portion of the yawed vehicle to thereby pivot the platform into the open position. In the open position, the flowing air 16 is distributed laterally through the air exit openings 53 formed by opposing sides 52 of the platform 42 and the underside of the vehicle 11. As a result, any pressure build-up against the rear underside of the vehicle 11 is reduced, thereby minimizing lift. In particular, the flowing air 16 is vented through the air exit openings 53 and around the fuel cell 32 to decrease the aerodynamic pressure acting against the rear surface or face of the fuel cell. The reduction in pressure adjacent the fuel cell 32 degrades lift and results in a downward force that is exerted against the rear surfaces of the vehicle 11.

In projecting results according to the present invention and method, a series of tests were conducted using computational fluid dynamics (CFD) wherein the present invention was incorporated into a NASCAR stock car. The tests evaluated the aerodynamic effectiveness of the present invention on a racing vehicle in a loss of control situation (i.e., yawed 180°). In preparation for testing, a commercial research facility measured the exterior geometry of the vehicle and formulated a computational model of the vehicle for use during the CFD simulations.

In order to evaluate the effects of the present invention as incorporated into a stock car, it is most meaningful to study the distribution of aerodynamic pressure on the vehicle surfaces. In short, down force is produced by creating higher pressure on the top surfaces of the vehicle as compared to the underside of the vehicle.

The results presented below include CFD simulations performed on three vehicle geometries under loss of control conditions. The vehicle geometries include the vehicle without the present invention (baseline vehicle), the vehicle with the preferred embodiment of the present invention incorporated therein, and the vehicle with the alternative embodiment of the present invention incorporated therein.

As described above, the preferred embodiment of the invention includes an air inlet opening 13 in the rear of the vehicle 11 between the rear deck 20 and the bumper 21, an air path 15, and an air exit opening 14 at the rear quarter panel region 30 of the vehicle. For the purposes of the CFD simulations, the cross-section of the air path 15 varies along its length.

Further, the alternative embodiment of the invention likewise included an air inlet opening 13 positioned in the rear of the vehicle 11 between the rear deck 20 and the bumper 21 and an air path 15 extending forward from the air inlet opening to the air exit opening 14. In the alternative embodiment, however, the air exit opening 14 is positioned in the top surface of the rear deck 20 adjacent the rear window as opposed to the rear quarter panel region 30. In both embodiments, for testing purposes, the air inlet opening 13 measured 5.5 inches in height and 36 inches in width. In the preferred embodiment, the air exit opening 14 measured 9.7 inches in height and 9.7 inches in width. In the alternative embodiment, the air exit opening 14 measured 9.5 inches in height and 20 inches in width.

During CFD simulations, the computer generated air flow simulated a vehicle traveling backward (i.e., yawed 180°) at 180 mph. The CFD calculations are presented in terms of lift. The CFD predicted aerodynamic lift on the baseline vehicle was 1575 pounds per square foot (lbf.). The predicted aerodynamic lift on the vehicle incorporating the preferred embodiment was 1468 lbf., which equates to 107 lbf. less lift (i.e., more down force) than the baseline vehicle lacking the present invention. The predicted aerodynamic lift for the vehicle incorporating the alternative embodiment was 1550 lbf., or 35 lbf. less lift than the baseline vehicle. Thus, testing indicates that the preferred embodiment generated less lift or more down force than the alternative embodiment.

Further optimization of the present invention suggests the incorporation of the platform 42 secured adjacent the fuel cell 32 as described in an alternative embodiment above and depicted in FIGS. 14A, 14B, and 15. As a vehicle spins, the pressure acting on the rear of the car (i.e., rear bumper and spoiler region) can exceed 3,500 lbf. CFD simulations predict that incorporation of the most preferred embodiment of the platform 42 as depicted in FIGS. 14A, 14B, and 15 can reasonably be expected to generate between about 900 and 950 lbf. of additional down force, most likely approximately 920 lbf. The platform 42 is designed to exceed a down force of 1,100 lbf.

Surface pressure simulations comparing the baseline vehicle and the vehicles incorporating the preferred and alternative embodiments indicate that the vehicle incorporating the preferred embodiments generated higher pressures (i.e., greater down force) at the rear deck 20, rear window 31, roof 17, engine hood 18, and air exit opening 14 of the vehicle. The vehicle incorporating the alternative embodiment generated higher pressures at the air exit opening 14.

Surface pressure predictions on the underside of the vehicles incorporating the preferred and alternative embodiments revealed a slightly higher pressure build up behind the fuel cell 32 and across the underbody region as compared to the baseline vehicle. Nevertheless, CFD predictions showed that incorporation of the rear platform 42 would likely reduce the pressure generated under the vehicle 11.

Confirming predicted expectations, CFD simulations indicated that the preferred embodiment directs the flowing exiting air 16 out of the rear quarter panel regions 30 of the vehicle 11 and around the sides such that the air flowing over the center of the vehicle remains attached to the surface of the roof 17. In this fashion, the center streamline of flowing air 16 interacts with the roof flaps 12. In other words, the preferred embodiment directs the flowing exiting air in such a manner to avoid interfering with the air spoiling operation of the roof flaps 12.

Finally, CFD simulations indicated that the preferred and alternative embodiments of the present invention alone, and not incorporated into the racing vehicle, produced from 101 to 189 lbf. of down force.

In the drawings and specification, there have been disclosed typical embodiments on the invention and, although specific terms have been employed, they have been used in a generic and descriptive sense only and not for purposes of limitation, the scope of the invention being set forth in the following claims.

That which is claimed is:

1. A vehicle apparatus for increasing the safety of vehicles traveling at high speed and that is particularly useful in vehicles used for competitive racing, said apparatus comprising:

a pivoting platform having a fixed end pivotally secured to a rear underside portion of said vehicle, a free end spaced inwardly of and apart from the rear bumper of said vehicle, and opposing edges, said platform having an internal planar side and an external planar side, said platform having a closed position and an open position; and first and second side panels connected to said opposing edges of said platform;

wherein said platform in the closed position is substantially flush with the rear underside portion of said vehicle when said vehicle is traveling forward, said free end of said platform pivoting open when said vehicle is yawed from a forward path of travel;

wherein said platform in the open position distributes flowing air traveling under said yawed vehicle in a manner that increases the downward force on said yawed vehicle.

2. A vehicle apparatus according to claim 1, wherein said platform in the closed position does not adversely affect the aerodynamic stability of the vehicle.

3. A vehicle apparatus according to claim 1, wherein said pivoting platform is substantially rectangular.

4. A vehicle apparatus according to claim 1, wherein said fixed end of said platform is pivotally secured to a fuel cell of said vehicle.

5. A vehicle apparatus according to claim 4, wherein said fixed end of said platform is pivotally secured to a lower edge of the fuel cell.

6. A vehicle apparatus according to claim 1, wherein said first and second side panels form substantially parallel planes.

7. A vehicle apparatus according to claim 1, wherein said first and second side panels each define at least one opening for diverting flowing air.

8. A vehicle apparatus according to claim 1, wherein said first and second side panels are substantially trapezoidal in shape.

9. A vehicle apparatus according to claim 1, further comprising a plurality of vanes secured to said internal planar side of said platform for diverting flowing air.

10. A vehicle apparatus according to claim 9, wherein said plurality of vanes are oriented on said platform to divert flowing air substantially downward and towards said opposing edges of said platform.

11. A vehicle apparatus according to claim 1, further comprising at least one rib secured to said internal planar side of said platform for diverting flowing air.

12. A vehicle apparatus according to claim 11, wherein said rib and said first and second side panels form substantially parallel planes.

13. A vehicle apparatus according to claim 1, further comprising:

at least one variable length connector having a first end pivotally secured to said internal planar side of said platform, and a second end adjustably secured to the frame of said vehicle, said connector positioned to restrict the range of movement of said platform between the closed position and the open position;

at least one resilient member mounted on said second end of said connector and positioned adjacent to said vehicle frame, said resilient member facilitating movement of said connector when said pivoting platform moves between the closed position and the open position; and at least one pivot hinge that connects said first end of said connector to said internal planar side of said platform.

14. A vehicle apparatus according to claim 13, wherein said connector includes an adjustable stop secured to said second end of said connector, said stop positioned adjacent to said resilient member.

15. A vehicle apparatus according to claim 14, wherein said stop secures said resilient member between said second end of said connector and said vehicle frame.

16. A vehicle apparatus according to claim 14, wherein movement of said stop along said second end of said connector adjusts the amount of tension exerted on said resilient member to thereby restrict or promote movement of said platform between the closed position and the open position.

17. A vehicle apparatus according to claim 13, wherein said resilient member is a spring.

18. A vehicle apparatus for increasing the safety of vehicles traveling at high speed and that is particularly useful in vehicles used for competitive racing, said apparatus comprising:

a substantially rectangular pivoting platform having a fixed end pivotally secured to a lower edge of a fuel cell of said vehicle, a free end spaced inwardly of and apart from the rear bumper of said vehicle, and opposing edges, said platform having an internal planar side and an external planar side, said platform having a closed position and an open position;

first and second side panels connected to said opposing edges of said platform, said first and second side panels each defining at least one opening for diverting flowing air;

a first and second variable length connector having first ends pivotally secured to said internal planar side of said platform, and second ends adjustably secured to the frame of said vehicle, respectively;

a first and second spring mounted on said second ends of said connectors and positioned adjacent to said vehicle frame, said first and second springs facilitating movement of said connectors when said pivoting platform moves between the closed position and the open position; and a first and second pivot hinge that connects said first ends of said connectors to said internal planar side of said platform;

wherein said first and second connectors are spaced apart and positioned to restrict the range of movement of said platform between the closed position and the open position.

19. A vehicle apparatus according to claim 18, wherein:

said platform in the closed position is substantially flush with the rear underside portion of said vehicle when said vehicle is traveling forward, said free end of said platform pivoting open when said vehicle is yawed from a forward path of travel;

wherein said platform in the open position distributes flowing air traveling under said yawed vehicle in a manner that increases the downward force on said yawed vehicle.

20. A vehicle apparatus according to claim 18, wherein said first and second side panels form substantially parallel planes.

21. A vehicle apparatus according to claim 18, wherein said first and second side panels are substantially trapezoidal in shape.

22. A vehicle apparatus according to claim 18, further comprising a plurality of vanes secured to said internal planar side of said platform for diverting flowing air.

23. A vehicle apparatus according to claim 22, wherein said plurality of vanes are oriented on said platform to divert flowing air substantially downward and towards said opposing edges of said platform.

24. A vehicle apparatus according to claim 18, further comprising at least one rib secured to said internal planar side of said platform for diverting flowing air, said rib and said first and second side panels forming substantially parallel planes.

25. A vehicle apparatus according to claim 18, wherein each of said first and second connectors include:
- a hollow shaft having a first end and a second end, said shaft defining a longitudinal axis, said shaft having threaded internal surfaces at each end;
- a first rod having a threaded surface that correspondingly engages said first end of said shaft; and
- a second rod having a threaded surface that correspondingly engages said second end of said shaft;
- wherein said first and second rods define said first and second ends of said connectors, respectively;
- wherein said threaded surfaces on said shaft, said first rod, and said second rod are oriented such that the length of said connector is varied by rotating said hollow shaft about its longitudinal axis to thereby move said first and second rods into and out of said ends of said hollow shaft.

26. A vehicle apparatus according to claim 25, wherein said second rod includes a threaded nut that secures said spring between said second end of said connector and said vehicle frame.

27. A vehicle apparatus according to claim 26, wherein movement of said nut along said second rod adjusts the amount of tension exerted on said spring to thereby restrict or promote movement of said platform between the closed position and the open position.

* * * * *

UNITED STATES PATENT AND TRADEMARK OFFICE
CERTIFICATE OF CORRECTION

PATENT NO. : 6,742,831 B2
DATED : June 1, 2004
INVENTOR(S) : Clayton B. Rees

It is certified that error appears in the above-identified patent and that said Letters Patent is hereby corrected as shown below:

Title page,
Item [56], References Cited, FOREIGN PATENT DOCUMENTS, "6/1998" should read -- 6/1984 --.

Column 1,
Line 17, "his" should read -- high --.

Signed and Sealed this

Twenty-third Day of November, 2004

JON W. DUDAS
*Director of the United States Patent and Trademark Office*